H. F. DIETZ.
EMERGENCY BRAKE FOR VEHICLES.
APPLICATION FILED SEPT. 29, 1909.
963,361.
Patented July 5, 1910.
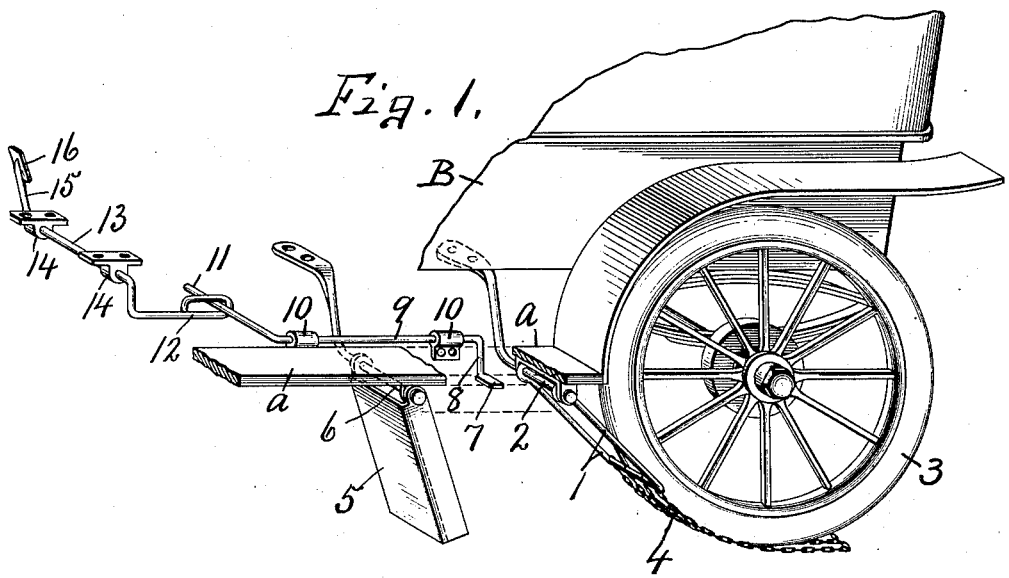
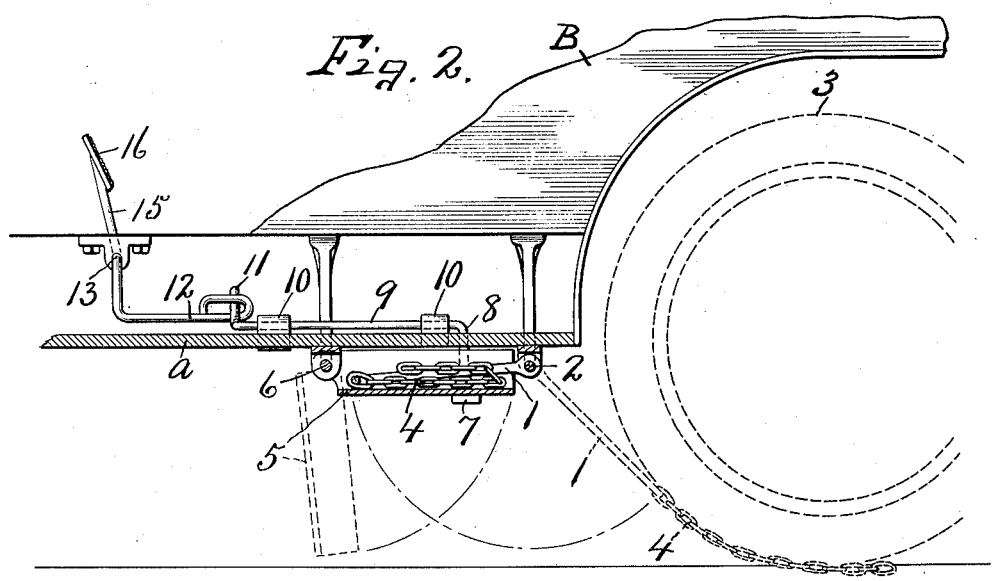

UNITED STATES PATENT OFFICE.

HERMAN F. DIETZ, OF LIVERPOOL, NEW YORK, ASSIGNOR OF ONE-HALF TO ANTHONY WILL, OF SYRACUSE, NEW YORK.

EMERGENCY-BRAKE FOR VEHICLES.

963,361. Specification of Letters Patent. Patented July 5, 1910.

Application filed September 29, 1909. Serial No. 520,175.

*To all whom it may concern:*

Be it known that I, HERMAN F. DIETZ, of Liverpool, in the county of Onondaga, in the State of New York, have invented new and useful Improvements in Emergency-Brakes for Vehicles, of which the following, taken in connection with the accompanying drawings, is a full, clear, and exact description.

This invention relates to certain improvements in emergency brakes for automobiles and similar vehicles and comprises a drag chain or shoe, which is normally held clear of the ground by a suitable detent, but may be instantly released when necessary by simply tripping the detent and allowing the chain or shoe to drop by gravity to the ground and trail under the wheel, thereby stopping the rotation of the wheel, almost instantaneously, by interposing between the wheel and ground the roughened drag or shoe.

The main object is to provide a simple emergency brake which may be readily attached to any automobile or similar vehicle, directly in front of one of the rear wheels and adapted to be instantly brought into action, when necessary, between the tread of the wheel and ground to not only check the rotation of the wheel, but also to afford a maximum degree of resistance against the sliding of the shoe upon the ground.

Another object is to provide a simple means whereby the brake shoe and its swinging support may be properly housed and concealed when not in use.

Other objects and uses relating to specific parts of the device will be brought out in the following description.

In the drawings: Figure 1 is a perspective view of a portion of an automobile, showing the application of my improved emergency brake shoe, said brake being shown in operative position. Fig. 2 is a side elevation of the detached brake mechanism shown by full lines in its inoperative position, and by dotted lines in its operative position.

In carrying out the objects stated, a swinging frame —1— is hinged at one end at —2—, in this instance to the under side of the running board or step, as —a—, of the machine, directly in front of one or both of the rear wheels, as —3—, so as to swing forwardly and rearwardly toward and from the wheel and also to and from a horizontal position of rest, when not in use.

A suitable shoe —4—, preferably consisting of a network of chains or combined chains and rods connected together, is attached at one end to the free end of the swinging frame —1— in such manner that when the swinging frame is released from its normal inoperative position, it will swing downwardly and rearwardly by its own gravity, toward and against the front face of the wheel —3— and allow the shoe —4— to trail upon the ground and under the tread face of said wheel, the chain shoe being flexible and readily conforming to the contour of the tire, so that when it is brought into use in case of emergency it not only effectively prevents further rotation of the wheel and affords greater resistance against sliding of the shoe, but also protects the tread of the tire against undue abrasion, such as would be produced by the sudden stoppage of the rotation of the wheel in direct sliding contact with the ground. The distance from the swinging axis to the bottom of the frame —1—, when in a vertical position, is less than the distance from said axis to the horizontal plane of the tread portion of the wheel in contact with the pavement, so as to allow the frame to swing freely, clear of the ground or pavement, although the combined length of the swinging frame and shoe —4— is considerably greater than such distance, thereby allowing a considerable portion of the shoe to trail upon the ground and directly under the tread of the wheel, when released from its normal position.

A suitable casing or housing —5— is hinged at one end at —6— to the under side of the running board or step —a—, some distance in front of the hinge connection —2— between the swinging frame —1— and running board, the length of the box being equal to or greater than the length of the swinging frame —1— and, when in its closed position against the under side of the running board, extends to or slightly beyond the hinge connection —2— and is of greater width than the swinging frame, so as to effectively inclose and conceal the swinging frame and shoe thereon, when the latter are folded and moved to their normal or inoperative position. The housing —5— is held in its normal or closed position by a suitable detent —7— which, in this instance, is formed upon or secured to a crank arm —8— of a rock shaft —9—, the latter extending lengthwise of the running board —a— and is journaled thereon in suitable bearings 10—. This rock shaft —9— is provided with an additional crank arm —11—, projecting inwardly under the body, as —B—, of the vehicle where it is operatively connected to a crank arm —12— of a suitable shaft —13—, which latter is journaled in suitable bearings —14— to the chassis or to the under side of the body —B—.

Secured to the rock shaft —13— is a crank arm —15— extending upwardly through the floor or bottom of the body —B— and provided at its upper end with a pedal —16— which is located within easy reaching distance of the foot of the driver, so that a slight forward pressure upon the pedal will effectively trip the detent —7— from its holding position and allow the housing —5— to swing downwardly and forwardly and thereby permit the frame —1— with the shoe —4— thereon to swing downwardly and rearwardly until the shoe drags upon the ground and trails under the tread of the wheel or between the wheel and pavement.

Although this brake may be used any time, it is designed to be used only in cases of emergency when the regular brakes have failed to operate or to prevent skidding of the rear end of the machine on slippery pavements, especially when bringing the machine to a stop on steep slippery descents.

In adjusting the device to its normal or inoperative position, the machine is backed off from the shoe whereupon the frame —1— may be rocked forwardly and upwardly by hand to a horizontal position against the under side of the running board —a—, thereby bringing the chain to a nearly vertical position or against the inner face of the housing —5—. The housing —5— is then rocked rearwardly and upwardly to a horizontal position against the under side of the running board —a—, thereby similarly folding the chain within the housing and beneath the running board, during which operation the detent —7— engages the under side of the housing to hold it in its inoperative position.

What I claim is:

1. An emergency brake for vehicle wheels comprising a swinging support, a series of chains connected to the support and adapted when released to trail under the wheel, a swinging housing hinged on a different axis from that of the support and movable to and from a horizontal position to receive and retain the chains and support in their inoperative position, and a movable detent operable at will for holding the housing in its operative position.

2. In combination with the top of a vehicle and vehicle wheel, a swinging support hinged to the under side of the step, a chain connected to the support and adapted when released to trail under the wheel, a housing also hinged to the under side of the step and movable toward and from the same for receiving and retaining the chain and its support in their inoperative positions, and movable means for retaining the housing in its operative position.

3. In an emergency brake for wheel vehicles, a swinging support and a swinging housing both mounted on separate axes and movable to and from a substantially horizontal position, movable means for holding the housing in such position, and a chain attached to the swinging support and adapted to trail under the wheel when the housing is released.

4. An emergency brake for vehicle wheels comprising a U-shaped supporting bar hinged at one end, chains attached to the opposite end of the bar and adapted when released to trail under the wheel, said bar and chains being foldable in a substantially horizontal position when not in use, and movable means controlled by the operator for holding said bar and chains in such position.

5. In an emergency brake for vehicles, a rigid support, a swinging frame hinged to the support in proximity to the periphery of the wheel, chains attached to the frame and adapted when released to trail under the wheel, a housing hinged to the rigid support some distance in front of the swinging frame and foldable to and from a horizontal position for receiving and retaining the swinging frame and chains in their inoperative position, and a movable detent operable at will for holding the housing in its operative position.

6. An emergency brake for vehicle wheels comprising a shoe-support hinged to the vehicle to swing toward and from the front face of one of the wheels, a flexible shoe connected to the support and adapted to trail under the wheel when the support is released, and a housing hinged to the vehicle for receiving the support and shoe and holding them away from such wheel.

In witness whereof I have hereunto set my hand on this 24th day of September 1909.

HERMAN F. DIETZ.

Witnesses:
H. E. Chase,
H. L. Humphrey.